United States Patent
Honkonen et al.

(10) Patent No.: US 8,098,144 B2
(45) Date of Patent: Jan. 17, 2012

(54) ALARM SYSTEM

(75) Inventors: Jarkko Honkonen, Oulu (FI); Yrjö Jurvansuu, Kempele (FI); Teijo Hildén, Liminka (FI); Toivo Vilmi, Kiviniemi (FI)

(73) Assignee: W-Secure Oy, Oulu (FI)

( * ) Notice: Subject to any disclaimer, the term of this patent is extended or adjusted under 35 U.S.C. 154(b) by 91 days.

(21) Appl. No.: 11/922,886

(22) PCT Filed: Jun. 22, 2006

(86) PCT No.: PCT/FI2006/050276
§ 371 (c)(1),
(2), (4) Date: Dec. 26, 2007

(87) PCT Pub. No.: WO2007/000489
PCT Pub. Date: Jan. 4, 2007

(65) Prior Publication Data
US 2008/0272897 A1 Nov. 6, 2008

(30) Foreign Application Priority Data
Jun. 27, 2005 (FI) .................................... 20055349

(51) Int. Cl.
B60R 25/10 (2006.01)
(52) U.S. Cl. .................... 340/426.33; 340/427; 340/429
(58) Field of Classification Search .............. 340/425.5, 340/426.1, 429, 426.24, 426.33, 566, 427; 73/146.2
See application file for complete search history.

(56) References Cited

U.S. PATENT DOCUMENTS

| | | | | |
|---|---|---|---|---|
| 3,828,150 A * | 8/1974 | Hubbard et al. | ........... | 200/61.46 |
| 4,947,151 A * | 8/1990 | Rosenberger | ........... | 340/426.33 |
| 5,132,665 A * | 7/1992 | Hutchisson et al. | ........... | 340/463 |
| 5,552,759 A * | 9/1996 | Stoyka | ........... | 340/426.33 |
| 5,598,358 A * | 1/1997 | Gender et al. | ........... | 702/105 |
| 6,204,758 B1 | 3/2001 | Wacker et al. | | |
| 6,324,919 B1 * | 12/2001 | Larsen et al. | ........... | 73/862.043 |
| 6,353,388 B1 * | 3/2002 | Durban et al. | ........... | 340/568.5 |
| 6,439,063 B1 * | 8/2002 | Schnackenberg | ........... | 73/862.041 |
| 6,446,005 B1 * | 9/2002 | Bingeman et al. | ........... | 701/215 |
| 6,681,646 B1 * | 1/2004 | Bacher et al. | ........... | 73/862.08 |
| 2003/0163255 A1 | 8/2003 | Ishigami et al. | | |
| 2004/0261512 A1 | 12/2004 | Daly et al. | | |
| 2006/0077048 A1 * | 4/2006 | Saitou et al. | ........... | 340/426.33 |
| 2007/0177834 A1 * | 8/2007 | Koyagi et al. | ........... | 384/448 |

FOREIGN PATENT DOCUMENTS

| | | |
|---|---|---|
| DE | 198 53 696 A1 | 5/2000 |
| DE | 199 62 072 A1 | 6/2001 |
| EP | 0830797 | 3/1998 |
| EP | 1172236 A2 | 1/2002 |

(Continued)

*Primary Examiner* — Brian Zimmerman
*Assistant Examiner* — An Nguyen
(74) *Attorney, Agent, or Firm* — Birch, Stewart, Kolasch & Birch, LLP

(57) ABSTRACT

The invention relates to an anti-theft alarm system for vehicle wheels. The system comprises at least one wireless measuring module for determining kinetic state information characterizing the kinetic state of a vehicle wheel on the basis of acceleration measurement. The wireless measuring module is further configured to be attached to the vehicle wheel, to generate a wireless data transfer signal on the basis of the kinetic state information and transmit the wireless data transfer signal. The system further comprises at least one wireless central processing unit, which is configured to receive the wireless data transfer signal and execute a predetermined alarm function when the wireless data transfer signal fulfils predetermined conditions.

14 Claims, 2 Drawing Sheets

FOREIGN PATENT DOCUMENTS

Figure 1:
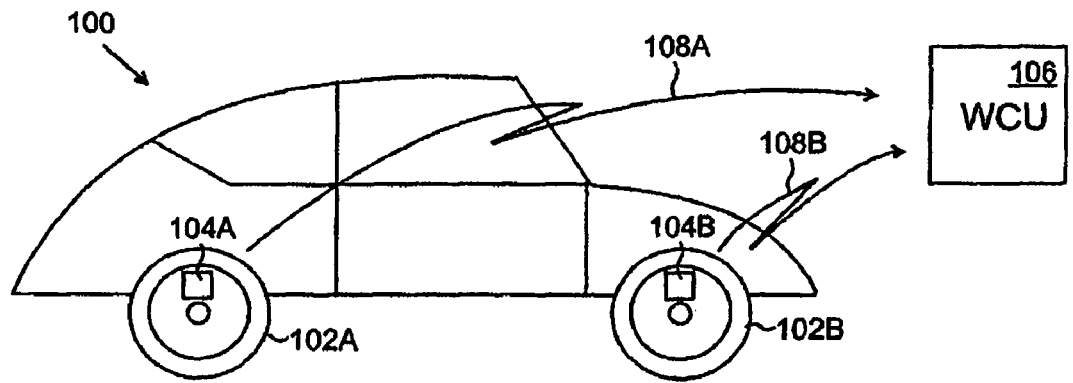

| | | |
|---|---|---|
| EP | 1 479 533 A2 | 11/2004 |
| FI | 113459 B | 4/2004 |
| GB | 2382205 A | 5/2003 |
| JP | 2004-198185 A | 7/2004 |
| JP | 2004198185 A * | 7/2004 |
| WO | WO-9638996 | 12/1996 |
| WO | WO-2005/023567 A1 | 3/2005 |
| WO | WO-2006/027133 A1 | 3/2006 |

\* cited by examiner

ALARM SYSTEM

FIELD

The invention relates to an alarm system, a measuring module of an alarm system, a vehicle wheel rim, and a central processing unit of an alarm system.

BACKGROUND

Thefts of vehicle wheels from storage and/or directly from the vehicle cause huge economic and social losses.

In prior art solutions, vehicle wheels are protected against theft by securing them mechanically to fastening structures provided in storage spaces or to vehicle axles using locks or special fasteners, which can be broken or opened by keys or special tools.

Drawbacks of the prior art solutions include the poor protection against theft provided by locks and special tools. It is thus useful to consider different anti-theft solutions for vehicle wheels.

BRIEF DESCRIPTION

The object of the invention is to implement a user-friendly alarm system which provides a good protection against theft of vehicle wheels.

A first aspect of the invention provides an anti-theft alarm system which comprises: at least one wireless measuring module for determining kinetic state information characterizing the kinetic state of a vehicle wheel on the basis of acceleration measurement, the wireless measuring module being further configured to be attached to the vehicle wheel, to generate a wireless data transfer signal on the basis of the kinetic state information and transmit the wireless data transfer signal; and at least one wireless central processing unit, which is configured to receive the wireless data transfer signal and execute a predetermined alarm function when the wireless data transfer signal fulfils predetermined conditions.

A second aspect of the invention provides a measuring module of an anti-theft alarm system which is configured to be attached to a vehicle wheel and comprises: a movement sensor for determining kinetic state information characterizing the kinetic state of the vehicle wheel; and a first wireless communication unit for generating a wireless data transfer signal on the basis of the kinetic state information and for transmitting the wireless data transfer signal to a central processing unit of the alarm system, which is configured to execute a predetermined alarm function when the wireless data transfer signal fulfils predetermined conditions.

A third aspect of the invention provides a vehicle wheel rim which comprises a wireless measuring module, which comprises: a movement sensor for determining kinetic state information characterising the kinetic state of a vehicle wheel on the basis of acceleration measurement; and a first wireless communication unit for generating a wireless data transfer signal on the basis of the kinetic state information and for transmitting the wireless data transfer signal to a central processing unit of an alarm system, which is configured to execute a predetermined alarm function when the wireless data transfer signal fulfils predetermined conditions.

A further aspect of the invention provides a central processing unit of an alarm system which comprises: a second communication unit for receiving a wireless data transfer signal, the wireless data transfer signal being generated by a wireless measuring module attached to a vehicle wheel and being based on kinetic state information characterizing the kinetic state of the vehicle wheel on the basis of acceleration measurement; and an alarm unit for executing a predetermined alarm function when the wireless data transfer signal fulfils predetermined conditions.

Preferred embodiments of the invention are described in the dependent claims.

The invention is based on the fact that a measuring module attached to a vehicle wheel determines kinetic state information on the vehicle wheel, and on the basis of this information, the wireless measuring module generates a wireless data transfer signal and transmits it to a wireless central processing unit. The wireless central processing unit receives the wireless data transfer signal and executes an alarm function if the data transfer signal fulfils predetermined conditions.

The alarm system according to the invention provides several advantages. One advantage is real-time protection against theft utilizing a remote alarm to a wireless processing unit.

LIST OF FIGURES

Figure 2:
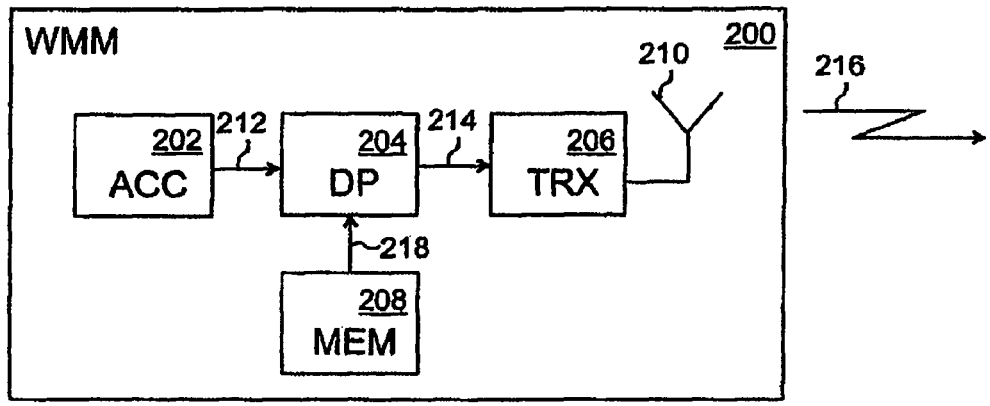
Figure 3:
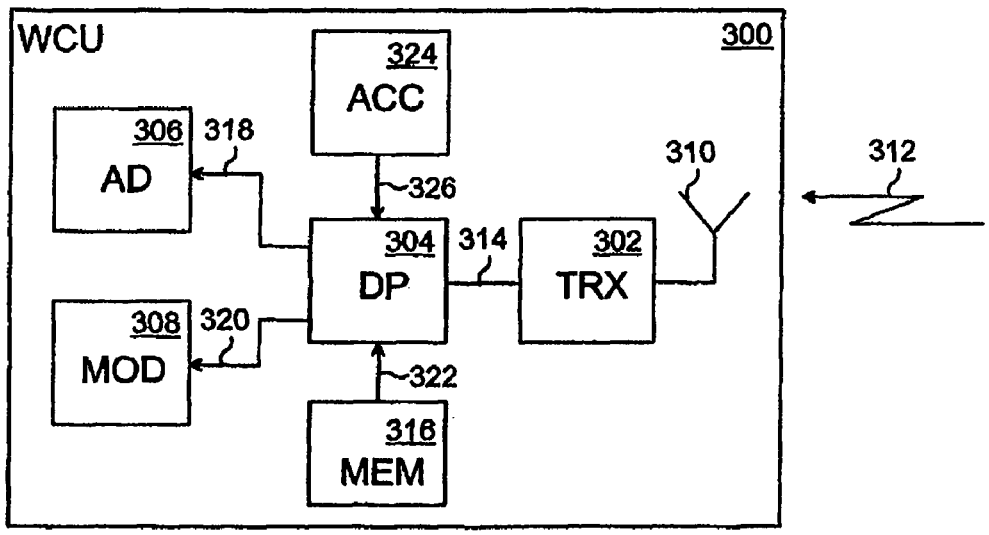
Figure 4:
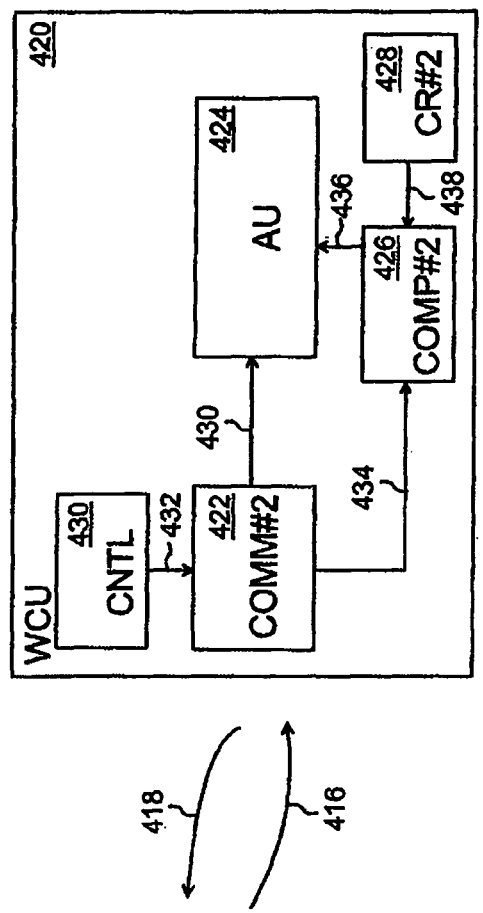
Figure 5:
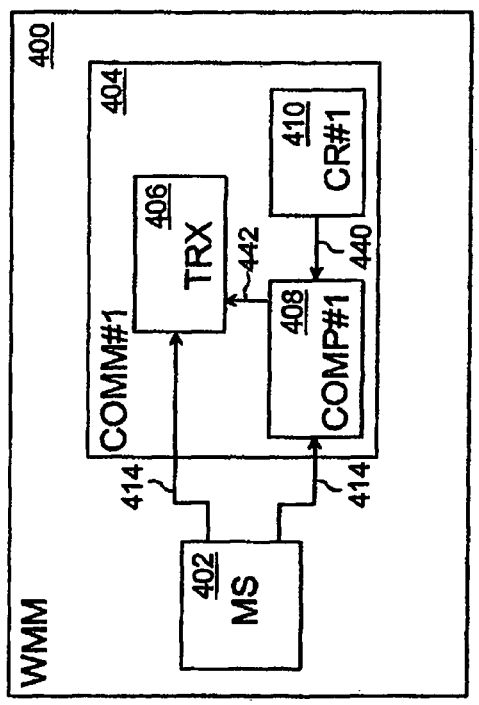
Figure 6:
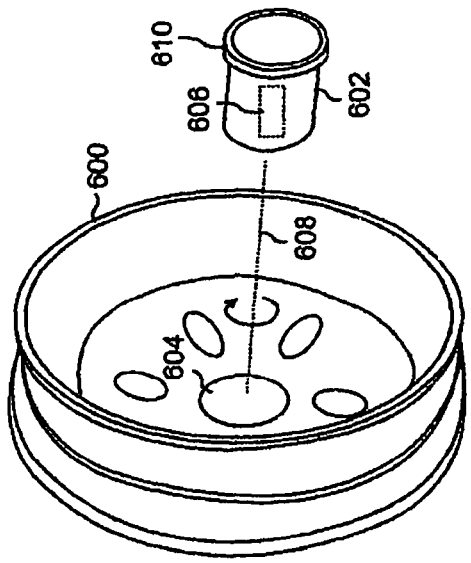
Figure 6:
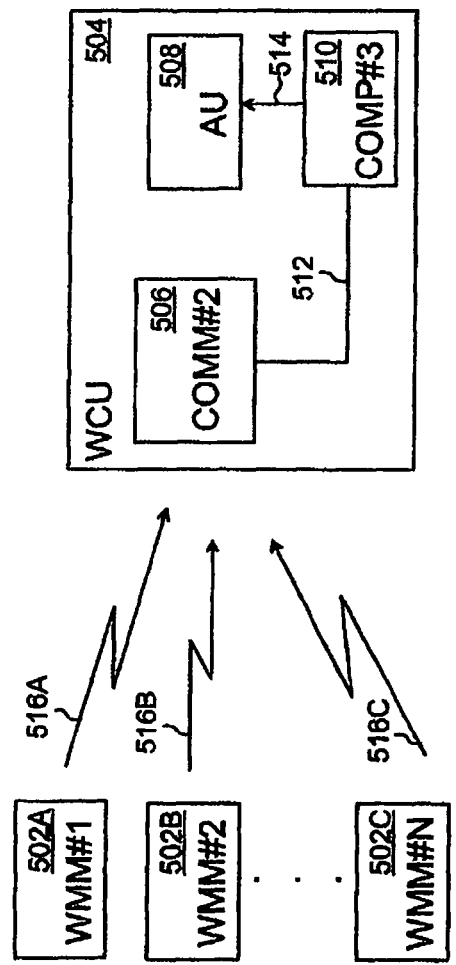

The invention will now be described in greater detail by means of preferred embodiments with reference to the accompanying drawings, in which FIG. 1 illustrates a first example of the structure of an alarm system, FIG. 2 illustrates a first example of the structure of a wireless measuring module, FIG. 3 illustrates a first example of the structure of a wireless central processing unit, FIG. 4 illustrates a second example of the structure of an alarm system, FIG. 5 illustrates a third example of the structure of an alarm system, and FIG. 6 illustrates an example of an embodiment of a vehicle wheel rim.

DESCRIPTION OF EMBODIMENTS

Referring to FIG. 1, an alarm system comprises wireless measuring modules 104A, 104B attached to wheels 102A, 102B of a vehicle 100. In addition, the alarm system comprises a wireless central processing unit (WCU) 106.

The vehicle 100 may be a car, lorry, motorcycle and/or a trailer. The presented solution is not, however, limited to these examples but the vehicle may be any means of transportation provided with wheels that are to be protected against theft.

The vehicle wheel 102A, 102B comprises at least a wheel rim. The wheel 102A, 102B may also be deemed to include a tyre, which may be made of rubber.

The wireless measuring module 104A, 104B determines kinetic state information on the basis of acceleration information measured from the vehicle 100 wheel 102A, 102B. The kinetic state information characterizes the kinetic state of the vehicle wheel 102A, 102B. The wireless measuring module 104A, 104B generates a wireless data transfer signal 108A, 108B on the basis of the kinetic state information and transmits the wireless data transfer signal 108A, 108B to the wireless central processing unit 106.

The wireless central processing unit 106 receives the wireless data transfer signal 108A, 108B and executes a predetermined alarm function when the data transfer signal 108A, 108B fulfils predetermined conditions.

The kinetic state information includes acceleration in one or more directions, velocity in one or more directions, rotation velocity in one or more directions and/or oscillating frequency in one or more directions. In an embodiment, the kinetic state information indicates whether the vehicle wheel 102A, 102B is moving or not. The presented solution is not, however, limited to the examples of kinetic state information described here, but the kinetic state information may be any kind of information on the kinetic state of the vehicle wheel 102A, 102B.

The wireless central processing unit 106 may be installed in the vehicle 100, in which case the wireless central processing unit 106 may utilize the vehicle 100 structures, such as a user interface and power source.

The presented solution may be used for monitoring wheels 102A, 102B secured to the vehicle 100 and/or wheels 102A, 102B stored in storage spaces.

Referring to FIG. 2, the wireless measuring module 200 typically comprises a transceiver (TRX) 206, a digital processor (DP) 204 connected to the transceiver 206, a memory unit (MEM) 208 connected to the digital processor 204, and an acceleration sensor (ACC) 202 connected to the digital processor 204.

As a primary variable, the acceleration sensor 202 measures acceleration information 212 in one or more directions. The acceleration information 212 is fed into the digital processor 204, which generates kinetic state information 214 from the acceleration information 212.

The digital processor 204 may load a computer program 218 from the memory unit 208, the computer program including encoded instructions for executing computer processes in the digital processor 204. The computer process may comprise generation of kinetic state information 214 from the acceleration information 212.

The acceleration sensor 202 may be, for example, a piezoelectric acceleration sensor. The structure and operation of acceleration sensors are known per se to a person skilled in the art, for which reason the structure and operation of acceleration sensors will not be discussed more closely in this context.

The digital processor 204 feeds kinetic state information 214 into the transceiver 206, which uses the kinetic state information 214 to form a wireless communication signal 216, which is transmitted via an antenna 210.

The wireless communication signal 216 may be a radio frequency signal, in which case the transceiver 206 typically comprises a radio transmitter.

In an embodiment, the radio transmitter is based on the BlueTooth technology.

In a second embodiment, the radio transmitter implements a wireless local area network (WLAN, Wireless Local Access Network) (WPAN; Wireless Personal Area Network), which may be based on the IEEE 802.15.4 protocol, for instance. In an embodiment, the radio transmitter implements a ZigBee interface.

In an embodiment, the wireless communication signal 216 is based on the use of a magnetic component of an electromagnetic field. In that case, the antenna 210 is typically replaced with an induction coil. The oscillating frequency of the electromagnetic field may be 100 kHz, but the presented solution is not limited to this frequency range.

Referring to FIG. 3, the wireless central processing unit 300 comprises an antenna 310, a transceiver (TRX) 302, a digital processor (DP) 304 connected to the transceiver 302, a memory unit 316 connected to the digital processor 304, an alarm device (AD) 306 connected to the digital processor 304, and a movement sensor (ACC) 324 connected to the digital processor 304.

The transceiver 302 may implement a wireless interface based on BlueTooth, WLAN, WPAN, ZigBee or magnetic data transfer.

The transceiver 302 receives a wireless data transfer signal via the antenna 310. The transceiver 302 feeds the information 314 included in the wireless data transfer signal 312 into the digital processor 304.

The digital processor 304 executes a computer process on the basis of encoded instructions 322 received from the memory unit 316. The computer process includes processing the information 314.

The digital processor 304 feeds an alarm signal 318 into the alarm device 306 if the wireless data transfer signal 312 fulfils predetermined conditions.

The movement sensor 324 measures movement of the wireless central processing unit 300 and feeds the measured kinetic information 326 into the digital processor 304.

The alarm device 306 may comprise a sound signalling device and/or a light signalling device, for example. The alarm device 306 may utilize systems integrated into the vehicle 100, such as sound and/or light signalling devices.

In an embodiment, the wireless central processing unit 300 comprises a radio modem 308, which implements a wireless connection from the wireless central processing unit 300 to a base station of a radio system. The radio system is, for example, a GSM (Global System for Mobile Communications) system.

The radio modem 308 may receive an alarm indication signal 320 from the digital processor 304 and give a remote alarm to a predetermined access point on the basis of the alarm indicating signal 320.

In an embodiment, the wireless central processing unit 300 is a computer, whose transceiver 302 may be, for example, a network card which implements a BlueTooth connection of a wireless local area network. In that case, the radio modem 308 can be replaced with a network card which implements an Internet connection. The same wireless network card may be used both for transferring the data transfer signal 312 and for the Internet connection. The computer may be, for example, a portable computer (laptop) or a desktop computer (PC).

In an embodiment, the wireless central processing unit 300 is a mobile phone, a PDA device (Personal Digital Assistant) or another portable electronic device which implements a wireless interface needed to transfer the data transfer signal 312.

Referring to FIG. 4, the wireless measuring module 400 of the alarm system comprises a first wireless communication unit (COMM#1) 404 and a movement sensor (MS) 402 connected to the first wireless communication unit 404.

In an embodiment, the movement sensor 402 determines kinetic state information 414 characterizing the movement of the vehicle 100 on the basis of acceleration measurement and feeds the kinetic state information 414 into the first wireless communication unit 404.

In an embodiment, the wireless measuring module 400 comprises a first comparison register (CR#1) 410, which includes reference information characterizing the characteristic kinetic state of the wheel 102A, 102B of the vehicle 100. The reference information 440 characterizes the kinetic state generated typically in connection with the normal use of the vehicle 100, the kinetic state including translational motion, rotational motion and/or oscillation of the wheel 102A, 102B. In an embodiment, the characteristic kinetic state of the vehicle wheel is a stable state, in which case reference information characterizes the motion of a stationary wheel. The reference information 440 may be encoded into the comparison register 410 as a velocity related to the translational motion, as a rotation velocity related to the rotational motion and/or as a frequency related to the oscillation. The comparison register 410 may also include limit values of the above-mentioned physical variables, such as the lower limit value and/or the upper limit value.

The reference information may be stored in the comparison register 410 before use in the production stage of the alarm system, for instance.

In an embodiment, the wireless measuring module 400 further comprises a first comparison unit (COMP#1) 408 for performing a comparison between the kinetic state information 414 and the reference information 440.

In an embodiment, the measuring sensor 402 feeds kinetic state information 414 into the first comparison unit 408. The comparison unit 408 may load reference information 440 from the first comparison register 410.

The first comparison unit 408 compares the kinetic state information 414 with the reference information 440, for example, by calculating a difference between the determined rotation velocity and the rotation velocity stored in the comparison register 410. A corresponding comparison may also be performed between the other determined pieces of kinetic state information 414 and reference information 440.

If the comparison between the kinetic state information 414 and the reference information 440 fulfils predetermined conditions, the first comparison unit 408 may feed an alarm indicator 442 into the transceiver 406, which includes the alarm indicator 442 in the wireless data transfer signal 416 and transmits the wireless data transfer signal 416 to the wireless central processing unit 420. The alarm indicator 422 may be a sign that the vehicle 100 wheel has been moved without permission.

The first communication unit 404 of the wireless measuring module 400 may be implemented by means of a computer program executed by the transceiver 206 and digital processor 204 of FIG. 2 and stored in the memory unit 208.

The measuring sensor 402 of the wireless measuring module 400 may be implemented by means of a computer program executed by the acceleration sensor 202 and digital processor 204 of FIG. 2 and stored in the memory unit 208.

The first comparison register 410 may be implemented by a computer program executed by the digital processor 204 of FIG. 2 and stored in the memory unit 208.

The first comparison unit 408 may be implemented by a computer program executed by the digital processor 204 of FIG. 2 and stored in the memory unit 208.

In an embodiment, the wireless central processing unit 420 comprises a second wireless communication unit (COOM#2) 422, which receives the wireless data transfer signal 416. The second wireless communication unit 422 decodes an alarm indicator 436 from the wireless data transfer signal 416 and feeds the alarm indicator 436 into an alarm unit 424.

The alarm unit 424 executes a predetermined alarm function on the basis of the alarm indicator 436. The predetermined alarm function may comprise a sound and/or light signal given by a signalling device. The predetermined alarm function may also include a remote alarm transmitted by the radio modem 308 to a predetermined destination address.

In an embodiment, the wireless central processing unit 420 comprises a controller (CTRL) 430 for generating control information 432. The controller 430 feeds the control information 432 into a second wireless communication unit 422, which includes control information 432 in a wireless control information signal 418 and transmits the wireless control information signal 418 to the wireless measuring module 400.

The first wireless communication unit 404 receives the wireless control information signal 418 and generates the wireless data transfer signal 416 on the basis of the control information 432.

The control information 432 may include reference information 440 to be updated to the first comparison register 410 and/or control information on the transceiver 406 for controlling the signal frequency, signal coding and/or time windowing of the wireless data transfer signal 416.

In an embodiment, the kinetic state information 414 is fed into the transceiver 406, which includes kinetic state information 414 in the wireless data transfer signal 416 and transmits the data transfer signal 416 to the second communication unit 422 of the wireless central processing unit 420.

The second communication unit 422 receives the wireless data transfer signal 416, decodes the kinetic state information 434 from the wireless data transfer signal 416 and feeds the kinetic state information 434 into the second comparison unit 426 of the wireless central processing unit 420.

The second comparison unit 426 retrieves reference information 438 from a second comparison register 428 and compares this information with the kinetic state information 434. If the comparison fulfils predetermined conditions, the second comparison unit 426 generates an alarm indicator 435 and feeds the alarm indicator 436 into the alarm unit 424.

The alarm unit 424 may execute a predetermined alarm function after it has received the alarm indicator 436.

The second comparison unit 426 may be implemented as a computer process in the digital processor 304 according to FIG. 3, the encoded instructions for the computer process being stored in the memory unit 316.

The second communication unit 422 may be implemented by means of a computer program executed by the transceiver 302 and digital processor 304 of FIG. 3 and stored in the memory unit 316.

The alarm unit 424 may be implemented by a computer program executed by the alarm device 306, radio modem 308 and digital processor 304 of FIG. 3 and stored in the memory unit 316.

The controller 430 may be implemented by a computer program executed by the digital processor 304 of FIG. 3 and stored in the memory unit 316.

The second comparison unit 426 may be implemented by a computer program executed by the digital processor 304 of FIG. 3 and stored in the memory unit 316.

The second comparison register 428 may be implemented by a computer program executed by the digital processor 304 of FIG. 3 and stored in the memory unit 316.

In an embodiment, the first and/or the second comparison register 410, 428 are updated by means of the kinetic reference information measured by the movement sensor of the central processing unit 420. The movement sensor is, for example, the movement sensor 324 illustrated in FIG. 3. If the central processing unit 420 is located in the vehicle 100, the second comparison unit 426 may compare the kinetic state of the wireless measuring module 400 with the kinetic state of the vehicle 100. If the kinetic states are different, the result can be interpreted as a theft situation of the wheel 102A, 102B, in which case an alarm function may be executed.

Referring to the example of FIG. 5, in one embodiment the alarm system comprises several wireless measuring modules (WMM#1, WMM#2, . . . , WMN#N) 502A, 502B, 502C, which may have the structure of the wireless measuring module 200 of FIG. 2 and the wireless measuring module 400 of FIG. 4. Each measuring module 502A, 502B, 502C is configured to be attached to a different wheel 102A, 102B of the vehicle 100, the wheels being secured to the vehicle and/or stored in storage spaces.

Each wireless measuring module 502A to 502C generates a wireless data transfer signal 516A to 516C and transmits the wireless data transfer signal 516A to 516C to a wireless central processing unit 504.

The wireless data transfer signal 516A to 516C may be provided with a measuring module specific identifier, which may be implemented by means of the frequency or time frame of the wireless data transfer signal 516A, 516C or by means of the code included in the wireless data transfer signal 516A, 516C.

The second communication unit 506 may receive the wireless data transfer signals 516A to 516C and generate an input 512 from the wireless data transfer signals 516A to 516C, which is fed into a third comparison unit (COMP3) 510. The third comparison unit 510 may be implemented by means of a computer program executed by the digital processor 304 of FIG. 3 and stored in the memory unit 316.

The third comparison unit 510 compares the information contents of the data transfer signals 516A to 516C with one another and feeds the comparison result 514 into the alarm unit 508.

The alarm unit 508 executes a predetermined alarm function when the comparison fulfils predetermined conditions.

In an embodiment, wireless data transfer signals 516A to 516C include kinetic state information 414. In that case, the input 512 includes kinetic state information 414 and the third comparison unit 510 compares the pieces of kinetic state information 414 determined by different wireless measuring modules 502A to 502C with one another. If the pieces of kinetic state information 414 received from different wireless measuring modules 502A to 502C are very similar, the comparison may be interpreted so that the vehicle is moving normally, parked or that the wheels 102A, 102B are in storage and no theft has occurred.

The alarm function may be executed if there is a deviation of a predetermined magnitude between the pieces of kinetic state information 414 produced by the measuring modules 502A to 502C.

Referring to the example of FIG. 6, in one embodiment the rim 600 comprises an adapter 602 on the rotation axis 608 of the rim 600 for connecting a wireless measuring module 606 to the rim 600. The rotation axis 608 of the rim may be the rotation axis of the vehicle 100 wheel 102A, 102B. In an embodiment, the adapter 602 is a capsule which is installed in the middle opening 604 of the rim from the direction of the vehicle 100 axle. The adapter 602 may comprise a flange 610, which prevents the adapter 602 from moving through the middle opening 604 outside the rim 600 when the rim 600 is mounted in the vehicle. In that case, it is difficult to remove the wireless measuring module 606 from the capsule without removing the rim 600 from the vehicle 100. Furthermore, the removal of the rim 600 from the vehicle 100 is difficult without causing movement of the wireless measuring module 606 and thus an alarm. The adapter 602 may also be fixed to the rim 600, in which case the wireless measuring module 606 may be arranged in the adapter also when the alarm system is used to monitor wheels and/or rims 600 that are in storage.

Referring further to FIG. 4, the movement sensor 402 may be configured to determine kinetic state information from the vicinity of the rim's rotation axis 608. The configuration may comprise dimensioning of the acceleration sensor 202 and adaptation of the computer program to execute processing of the kinetic state information so that, for example, the vicinity of the rotation axis 608 is taken into account. The vicinity of the rotation axis 608 enables the use of sensitive acceleration sensors 202 because the vicinity of the rotation axis decreases the centrifugal force directed at the acceleration sensor 202.

The configuration of the movement sensor 402 may also comprise orientation of the movement sensor 402 with respect to the rotation axis 608 so that degrees of freedom of movement, such as degrees of freedom of rotation, degrees of freedom of oscillation and degrees of freedom of translation, are as clearly distinguishable from one another as possible. This reduces the amount of processing required by the kinetic state information.

Even though the invention was described above with reference to the example according to the accompanying drawings, it is clear that the invention is not limited thereto but it may be modified in various ways within the scope of the appended claims.

The invention claimed is:

1. An anti-theft alarm system for vehicle wheels, comprising:
    at least one wireless measuring module for determining kinetic state information characterizing the kinetic state of a vehicle wheel on the basis of an acceleration, velocity or oscillation frequency measurement, the wireless measuring module being further configured to be attached to the vehicle wheel, to generate a wireless data transfer signal on the basis of the kinetic state information and transmit the wireless data transfer signal;
    at least one adapter configured to attach a wireless measuring module to a middle opening of a rim of the vehicle wheel, the adapter comprising a flange preventing the adapter and the wireless measuring module from being removed from the rim without removing the rim from the vehicle, the adapter and the wireless measuring module being separate from an axle of the vehicle and attachable to the rim before the rim is mounted to the vehicle, the wireless measuring module configured to determine said kinetic state information from a vicinity of the rotational axis of the vehicle wheel; and
    at least one wireless central processing unit, which is configured to receive the wireless data transfer signal and execute a predetermined alarm function when the wireless data transfer signal fulfills predetermined conditions indicative of a theft alarm status.

2. The alarm system according to claim 1, wherein the wireless central processing unit is configured to include control information in a wireless control information signal and transmit the wireless control information signal;
    the wireless measuring module is configured to receive the wireless control information signal; and
    the wireless measuring module is configured to generate a wireless data transfer signal on the basis of the control information.

3. The alarm system according to claim 1, wherein the alarm system comprises:
    several wireless measuring modules for determining kinetic state information characterizing the motion of the vehicle wheel on the basis of acceleration measurement, each of the wireless measuring modules being configured to be attached to a different wheel of the vehicle, to generate a wireless data transfer signal on the basis of the kinetic state information and transmit the wireless data transfer signal;
    the central processing unit is configured to receive several wireless data transfer signals;
    the central processing unit is configured to perform a comparison between the several wireless data transfer signals; and
    the central processing unit is configured to execute a predetermined alarm function when the comparison fulfils predetermined conditions.

4. The alarm system according to claim 1, wherein the wireless measuring module further comprises a comparison register, which includes reference information characterizing the characteristic kinetic state of the vehicle wheel;
  the wireless measuring module is configured to perform a comparison between the kinetic state information and the reference information;
  the wireless measuring module is configured to include an alarm indicator in the wireless data transfer signal when the comparison fulfils predetermined conditions; and
  the wireless central processing unit is configured to execute a predetermined alarm function on the basis of the alarm indicator.

5. The alarm system according to claim 1, wherein the wireless measuring module is configured to include kinetic state information in the wireless data transfer signal;
  the wireless central processing unit further comprises a comparison register, which includes reference information characterizing the characteristic kinetic state of the vehicle wheel;
  the wireless central processing unit is configured to perform a comparison between the kinetic state information and the reference information; and
  the wireless central processing unit is configured to execute a predetermined alarm function when the comparison fulfils predetermined conditions.

6. A measuring module of an anti-theft alarm system, wherein the measuring module is configured to be attached to a vehicle wheel and comprises:
  a movement sensor for determining kinetic state information characterizing the kinetic state of the vehicle wheel on the basis of an acceleration, velocity or oscillation frequency measurement;
  an adapter configured to attach the measuring module to a middle opening of a rim of the vehicle wheel, the adapter comprising a flange preventing the adapter and the measuring module from being removed from the rim without removing the rim from the vehicle, the adapter and the measuring module being separate from an axle of the vehicle and attachable to the rim before the rim is mounted to the vehicle, the movement sensor configured to determine said kinetic state information from a vicinity of the rotational axis of the vehicle wheel; and
  a first wireless communication unit for generating a wireless data transfer signal on the basis of the kinetic state information and for transmitting the wireless data transfer signal to a central processing unit of the alarm system, which is configured to execute a predetermined alarm function when the comparison fulfills predetermined conditions indicative of a theft alarm status.

7. The measuring module according to claim 6, wherein the first wireless communication unit is configured to receive a wireless control information signal, which includes control information; and
  the first wireless communication unit is configured to generate a wireless data transfer signal on the basis of the control information.

8. The measuring module according to claim 6, wherein the measuring module further comprises:
  a first comparison register, which includes reference information characterizing the characteristic kinetic state of the vehicle wheel;
  a first comparison unit for performing a comparison between the kinetic state information and the reference information; and
  the first wireless communication unit is configured to include an alarm indicator in the wireless data transfer signal when the comparison fulfils predetermined conditions.

9. The measuring module according to claim 6, wherein the first communication unit is configured to include kinetic state information in the wireless communication signal.

10. A vehicle wheel rim, comprising: a wireless measuring module, which comprises:
  a movement sensor for determining kinetic state information characterizing the kinetic state of a vehicle wheel on the basis of an acceleration, velocity or oscillation frequency measurement;
  an adapter configured to attach the wireless measuring module to a middle opening of the rim, the adapter comprising a flange preventing the adapter and the wireless measuring module from being removed from the rim without removing the rim from the vehicle, the adapter and the wireless measuring module being separate from an axle of the vehicle and attachable to the rim before the rim is mounted to the vehicle, the movement sensor configured to determine said kinetic state information from a vicinity of the rotational axis of the vehicle wheel; and
  a first wireless communication unit for generating a wireless data transfer signal on the basis of the kinetic state information and for transmitting the wireless data transfer signal to a central processing unit of an alarm system, which is configured to execute a predetermined alarm function when the wireless data transfer signal fulfills predetermined conditions indicative of a theft alarm status.

11. The rim according to claim 10, wherein the first wireless communication unit is configured to receive a wireless control information signal, which includes control information; and
  the first wireless communication unit is configured to generate a wireless data transfer signal on the basis of the control information.

12. The rim according to claim 10, wherein the wireless measuring module further comprises:
  a first comparison register, which includes reference information characterizing the characteristic kinetic state of the vehicle wheel;
  a first comparison unit for performing a comparison between the kinetic state information and the reference information; and
  the first wireless communication unit is configured to include an alarm indicator in the wireless data transfer signal when the comparison fulfils predetermined conditions.

13. The rim according to claim 10, wherein the first communication unit is configured to include kinetic state information in the wireless communication signal.

14. The rim according to claim 10, wherein the rim comprises an adapter arranged on the rotation axis of the rim for connecting the wireless measuring module; and
  the movement sensor is configured to determine kinetic state information from the vicinity of the rotation axis of the vehicle wheel.

* * * * *